US012770614B2

(12) United States Patent
Chang

(10) Patent No.: US 12,770,614 B2
(45) Date of Patent: Oct. 20, 2026

(54) CONTEXT-AWARE END-TO-END ASR FUSION OF CONTEXT, ACOUSTIC AND TEXT PRESENTATIONS

(71) Applicant: Google LLC, Mountain View, CA (US)

(72) Inventor: Shuo-yiin Chang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 365 days.

(21) Appl. No.: 18/489,970

(22) Filed: Oct. 19, 2023

(65) Prior Publication Data

US 2024/0185844 A1 Jun. 6, 2024

Related U.S. Application Data

(60) Provisional application No. 63/380,356, filed on Oct. 20, 2022.

(51) Int. Cl.
*G10L 15/18* (2013.01)
*G10L 15/183* (2013.01)

(52) U.S. Cl.
CPC ............ *G10L 15/18* (2013.01); *G10L 15/183* (2013.01)

(58) Field of Classification Search
CPC ....... G10L 15/16; G10L 15/18; G10L 15/183; G10L 15/063; G10L 15/22; G10L 15/30; G10L 15/32; G10L 15/26; G10L 15/005; G10L 15/02; G10L 19/167; G10L 2015/226; G10L 15/197; G10L 25/30; G10L 15/00; G10L 15/04; G10L 19/16; G10L 2015/0635; G10L 2015/223;
(Continued)

(56) References Cited

U.S. PATENT DOCUMENTS 10,229,672 B1 * 3/2019 Rao .......................... G10L 15/16
10,540,957 B2 * 1/2020 Hannun ................ G10L 15/063
(Continued)

OTHER PUBLICATIONS

Wei Kai et al: "Attentive Contextual Carryover for Multi-Turn End-to-End Spoken Language Understanding", 2021 IEEE Automatic Speech Recognition and Understanding Workshop (ASRU), IEEE, Dec. 13, 2021 (Dec. 13, 2021), pp. 837-844, XP034076863.
(Continued)

*Primary Examiner* — Abdelali Serrou
(74) *Attorney, Agent, or Firm* — Honigman LLP; Brett A. Krueger; Grant Griffith

(57) ABSTRACT

A method includes receiving a sequence of acoustic frames characterizing an input utterance and generating a higher order feature representation for a corresponding acoustic frame in the sequence of acoustic frames by an audio encoder of an automatic speech recognition (ASR) model. The method also includes generating a context embedding corresponding to one or more previous transcriptions output by the ASR model by a context encoder of the ASR model and generating, by a prediction network of the ASR model, a dense representation based on a sequence of non-blank symbols output by a final Softmax layer. The method also includes generating, by a joint network of the ASR model, a probability distribution over possible speech recognition hypotheses based on the context embeddings generated by the context encoder, the higher order feature representation generated by the audio encoder, and the dense representation generated by the prediction network.

22 Claims, 6 Drawing Sheets

(58) Field of Classification Search
CPC ... G10L 2015/025; G10L 15/05; G10L 15/06; G10L 15/083; G10L 15/1815; G10L 15/19; G10L 15/24; G10L 15/25; G10L 2015/221; G10L 2025/932; G10L 25/57; G10L 25/93
See application file for complete search history.

(56) References Cited

U.S. PATENT DOCUMENTS

| | | | | |
|---|---|---|---|---|
| 11,043,214 | B1 | 6/2021 | Hedayatnia et al. | |
| 11,961,522 | B2 * | 4/2024 | Kim | G10L 25/21 |
| 2020/0357388 | A1 * | 11/2020 | Zhao | G10L 15/26 |
| 2020/0380215 | A1 * | 12/2020 | Kannan | G06F 40/40 |
| 2021/0005184 | A1 * | 1/2021 | Rao | G10L 15/187 |
| 2021/0233510 | A1 * | 7/2021 | Datta | G10L 15/005 |
| 2021/0280170 | A1 * | 9/2021 | Chen | G10L 15/16 |
| 2023/0186903 | A1 * | 6/2023 | Cui | G10L 15/063 704/232 |
| 2026/0141898 | A1 * | 5/2026 | Wu | G10L 15/22 |

OTHER PUBLICATIONS

International Search Report and Written Opinion issued in related PCT Application No. PCT/US2023/035486, dated Feb. 12, 2024.

* cited by examiner

CONTEXT-AWARE END-TO-END ASR FUSION OF CONTEXT, ACOUSTIC AND TEXT PRESENTATIONS

CROSS REFERENCE TO RELATED APPLICATIONS

This U.S. Patent Application claims priority under 35 U.S.C. § 119(e) to U.S. Provisional Application 63/380,356, filed on Oct. 20, 2022. The disclosure of this prior application is considered part of the disclosure of this application and is hereby incorporated by reference in its entirety.

TECHNICAL FIELD

This disclosure relates to context-aware end-to-end ASR fusion of context, acoustic and text representations.

BACKGROUND

Automatic speech recognition (ASR) is the process transcribing input audio. ASR systems aim to optimize recognition performance including accuracy performance (e.g., word error rate (WER)) and latency performance (e.g., delay between speaking and generating the transcription). In long-form speech scenarios, conventional ASR systems segment the input audio into multiple segments and transcribe each segment independently from one another. Oftentimes, however, contextual information over multiple utterances provides useful information when transcribing speech. As such, conventional systems that process each segment of speech indecently may misrecognize particular spoken terms that otherwise could accurately be recognized when considering the contextual information from previous utterances.

SUMMARY

One aspect of the disclosure provides an automated speech recognition (ASR) model that includes an audio encoder configured to receive, as input, a sequence of acoustic frames characterizing an input utterance and generate a higher order feature representation for a corresponding acoustic frame in the sequence of acoustic frames at each of a plurality of output steps. The ASR model also includes a context encoder configured to receive one or more previous transcriptions output by the ASR model as input and generate a context embedding corresponding to the one or more previous transcriptions at each of the plurality of output steps. Each previous transcription corresponds to a respective previous utterance that includes one or more words. The ASR model also includes a prediction network configured to receive, as input, a sequence of non-blank symbols output by a final Softmax layer and generate a dense representation at each of the plurality of output steps. The ASR model also includes a joint network configured to receive, as input, the context embedding generated by the context encoder at each of the plurality of output steps, the higher order feature representation generated by the audio encoder at each of the plurality of output steps, and the dense representation generated by the prediction network at each of the plurality of output steps and generate a probability distribution over possible speech recognition hypotheses at each of the plurality of output steps.

Implementations of the disclosure may include one or more of the following optional features. In some implementations, the final Softmax layer is configured to identify, for each probability distribution over possible speech recognition hypotheses and at each of the plurality of output steps, a respective one of the possible speech recognition hypotheses having a corresponding highest probability from the probability distribution and generate, at each of the plurality of output steps, a transcription of the input utterance based on the identified respective one of the possible speech recognition hypotheses having the corresponding highest probability. The ASR model further includes a decoder including the joint network, the prediction network, and the final Softmax layer.

In some examples, context encoder includes a pre-trained Bidirectional Encoder Representations from Transformers (BERT) model configured to receive, as input, the one or more previous transcriptions output by the ASR model and generate a sequence of wordpiece embeddings based on the one or more previous transcriptions at each of the plurality of output steps. In these examples, the context encoder further includes a pooling layer configured to generate, at each of the plurality of output steps, the context embedding by applying self-attentive pooling over all the wordpiece embeddings from the sequence of wordpiece embeddings. Here, each respective wordpiece embedding of the sequence of wordpiece embeddings includes a corresponding weight and applying self-attentive pooling over all the wordpiece embeddings from the sequence of wordpiece embeddings includes generating a reweighted sequence of wordpiece embeddings by reweighting the corresponding weight of each respective wordpiece embedding. The pooling layer may include a stack of multi-head self-attention layers including at least one of Conformer layers, Transformer layers, or Performer layers.

In some examples, the pre-trained BERT model is configured to prepend a first classification token to a beginning of the sequence of wordpiece embeddings and append a second classification token to an end of the sequence of wordpiece embeddings. In these examples, the context encoder generates the context embedding based on the first classification token. In some implementations, the audio encoder is further configured to receive, as input, the context embedding generated by the context encoder at each of the plurality of output steps and audio encoder generates the higher order feature representation based on the context embedding.

Another aspect of the disclosure provides a computer-implemented method that when executed on data processing hardware causes the data processing hardware to perform operations for executing a context aware end-to-end speech recognition model. The operations include a sequence of acoustic frame characterizing an input utterance as input to an automatic speech recognition (ASR) model. The operations also include generating, at each of a plurality of output steps, a higher order feature representation for a corresponding acoustic frame in the sequence of acoustic frames by an audio encoder of the ASR model. The operations also include generating, by a context encoder and at each of the plurality of output steps, a context embedding corresponding to one or more previous transcriptions output by the ASR model. Each previous transcription corresponding to a respective previous utterance including one or more words. The operations also include generating, by a prediction network of the ASR model and at each of the plurality of output steps, a dense representation based on a sequence of non-blank symbols output by a final Softmax layer. The operations also include generating, at each of the plurality of output steps, a probability distribution over possible speech recognition hypotheses by a joint network of the ASR model. The probability distribution over possible speech recognition hypotheses based on the context embeddings generated by the context encoder at each of the plurality of output steps, the higher order feature representation generated by the audio encoder at each of the plurality of output steps, and the dense representation generated by the prediction network at each of the plurality of output steps.

Implementations of the disclosure may include one or more of the following optional features. In some implementations, the operations further include: for each probability distribution over possible speech recognition hypotheses, identifying, by the final Softmax layer and at each of the plurality of output steps, a respective one of the possible speech recognition hypotheses having a corresponding highest probability from the probability distribution; and generating, by the final Softmax layer and at each of the plurality of output steps, a transcription of the input utterance based on the identified respective one of the possible speech recognition hypotheses having the corresponding highest probability. The ASR model may include a decoder including the joint network, the prediction network, and the final Softmax layer.

In some examples, the context encoder includes a pre-trained Bidirectional Encoder Representations from Transformers (BERT) model and the operations further include generating, by the pre-trained BERT model and at each of the plurality of output steps, a sequence of wordpiece embeddings based on the one or more previous transcriptions output by the ASR model. In these examples, the context encoder further includes a pooling layer and the operations further include generating, by the pooling layer and at each of the plurality of output steps, the context embedding by applying self-attentive pooling over all the wordpiece embeddings from the sequence of wordpiece embeddings. Here, each respective wordpiece embedding of the sequence of wordpiece embeddings may include a corresponding weight and applying self-attentive pooling over all the wordpiece embeddings from the sequence of wordpiece embeddings includes generating a reweighted sequence of wordpiece embeddings by reweighting the corresponding weight of each respective wordpiece embedding. The pooling layer may include a stack of multi-head self-attention layers including at least one of Conformer layers, Transformer layers, or Performer layers.

In some implementations, the operations further include prepending a first classification token to a beginning of the sequence of wordpiece embeddings by the pre-trained BERT model and appending a second classification token to an end of the sequence of wordpiece embeddings by the pre-trained BERT model. In these implementations, the context encoder generates the context embedding based on the first classification token. Generating the higher order feature representation may be based on the context embedding.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
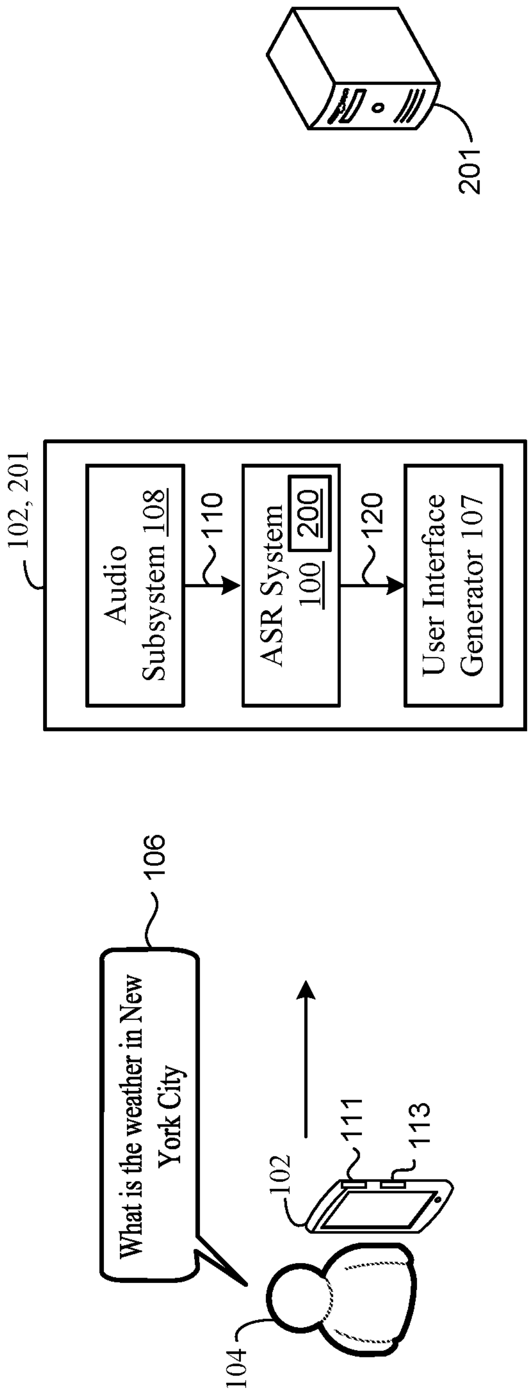
FIG. 1 is a schematic view of an example speech recognition system.

Conventional automatic speech recognition (ASR) systems are built to recognize independent short utterances that have a duration from a few seconds to tens of seconds. As such, in order to recognize a long-form audio input that has a duration from tens of minutes to hours, such as a meeting, lecture, or video, conventional ASR systems first segment the long-form audio into multiple short segments and then recognize speech from each segment individually. However, processing each segment of speech in this manner results in a loss of cross-utterance context which oftentimes provides useful contextual information including topics of speech or speaker information. This problem is further compounded when the audio input includes rare words or unique speaking styles/accents.

For example, for the spoken audio input of "Big game is at Berkeley this year. I think Cal will be the winner" a conventional ASR system segments the audio into two segments and correctly transcribes "Big game is at Berkeley this year." from the first segment, but incorrectly transcribes "I think Kyle will be the winner" from the second segment. Notably, in this example, the conventional ASR system misrecognized the term "Cal" (e.g., a social expression for University of California, Berkeley) with the acoustically similar term "Kyle" because the conventional ASR system processed the second segment independently from the first segment. However, had the ASR system considered the context of the previous utterance (e.g., "Big game is at Berkeley this year."), instead of processing the second segment independently, the ASR system would have likely correctly recognized the term "Cal." Thus, leveraging context and understanding the semantic relationship among utterances may lead to significantly increased recognition accuracy of long-form speech recognition tasks.

Accordingly, implementations herein are directed towards an ASR model and method that incorporates cross-utterance context when transcribing speech. As used herein, cross-utterance context refers to context, such as semantic understanding, of one or more previously spoken utterances in a sequence of spoken utterances. In particular, the ASR model receives a sequence of acoustic frames characterizing an input utterance and an audio encoder of the ASR model generates a higher order feature representation for a corresponding acoustic frame in the sequence of acoustic frames. Moreover, a context encoder of the ASR model generates a context embedding based on one or more previous transcriptions output by the ASR model and a prediction network of the ASR model generates a dense representation based on a sequence of non-blank symbols output by a final Softmax layer. Notably, one or more of the previous transcriptions may correspond to responses from a digital assistant during previous turns in a conversation with a user. Thereafter, a joint network of the ASR model generates a probability distribution over possible speech recognition hypotheses based on the context embeddings generated by the context encoder, the higher order feature representation generated by the audio encoder, and the dense representation generated by the prediction network.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware and memory hardware 113.

The user device 102 includes an audio subsystem 108 configured to receive an utterance spoken by the user 104 (e.g., the user device 102 may include one or more microphones for recording the utterance 106) and convert the utterance 106 into a corresponding digital format associated with input acoustic frames 110 capable of being processed by the ASR system 100. In the example shown, the user 104 speaks a respective utterance 106 in a natural language of English for the phrase "What is the weather in New York City?" and the audio subsystem converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the fried to listen to the message conveyed in the original utterance 106.

Figure 2A:
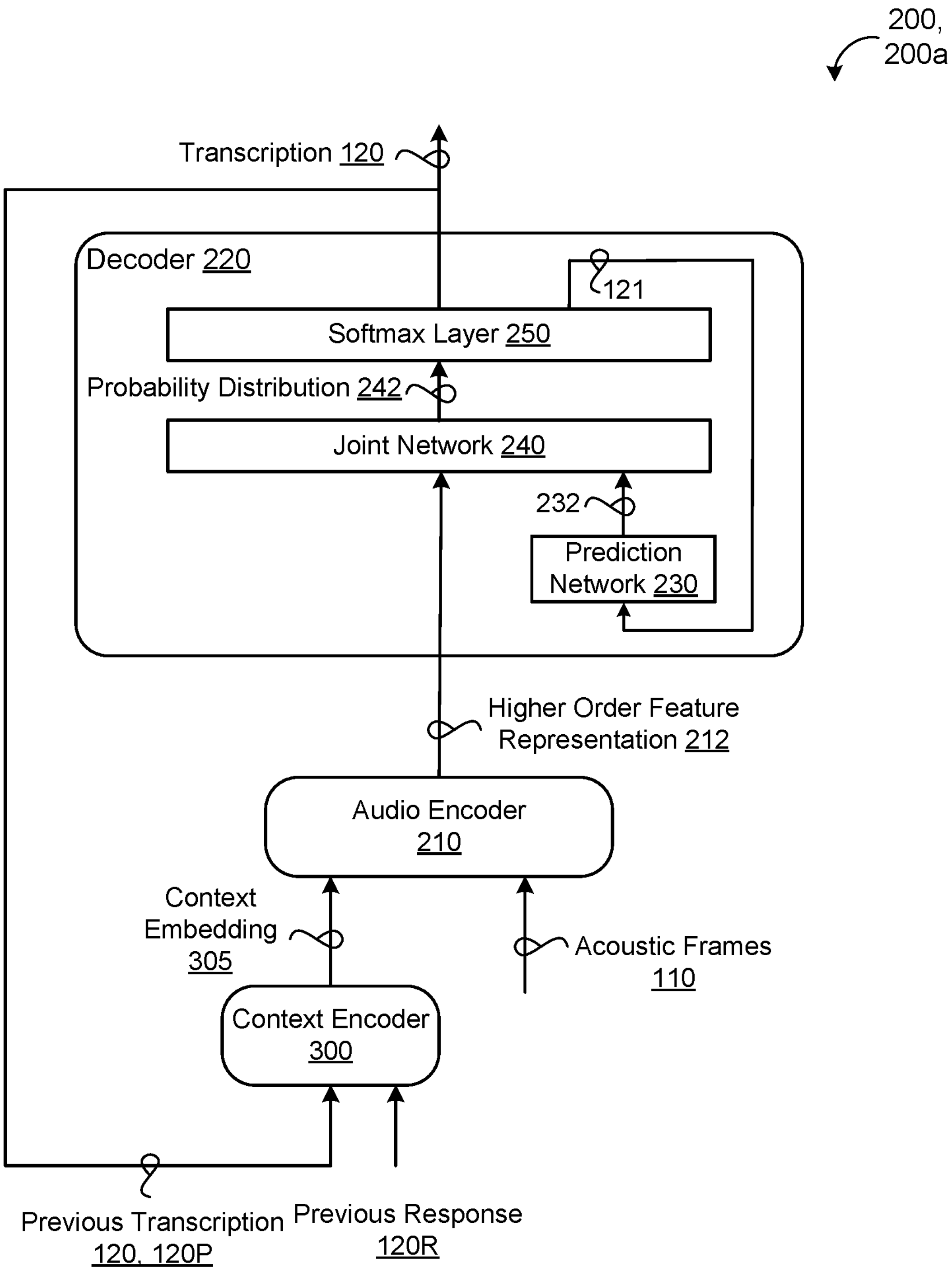
FIGS. 2A and 2B are schematic views of example speech recognition models.
Figure 2B:
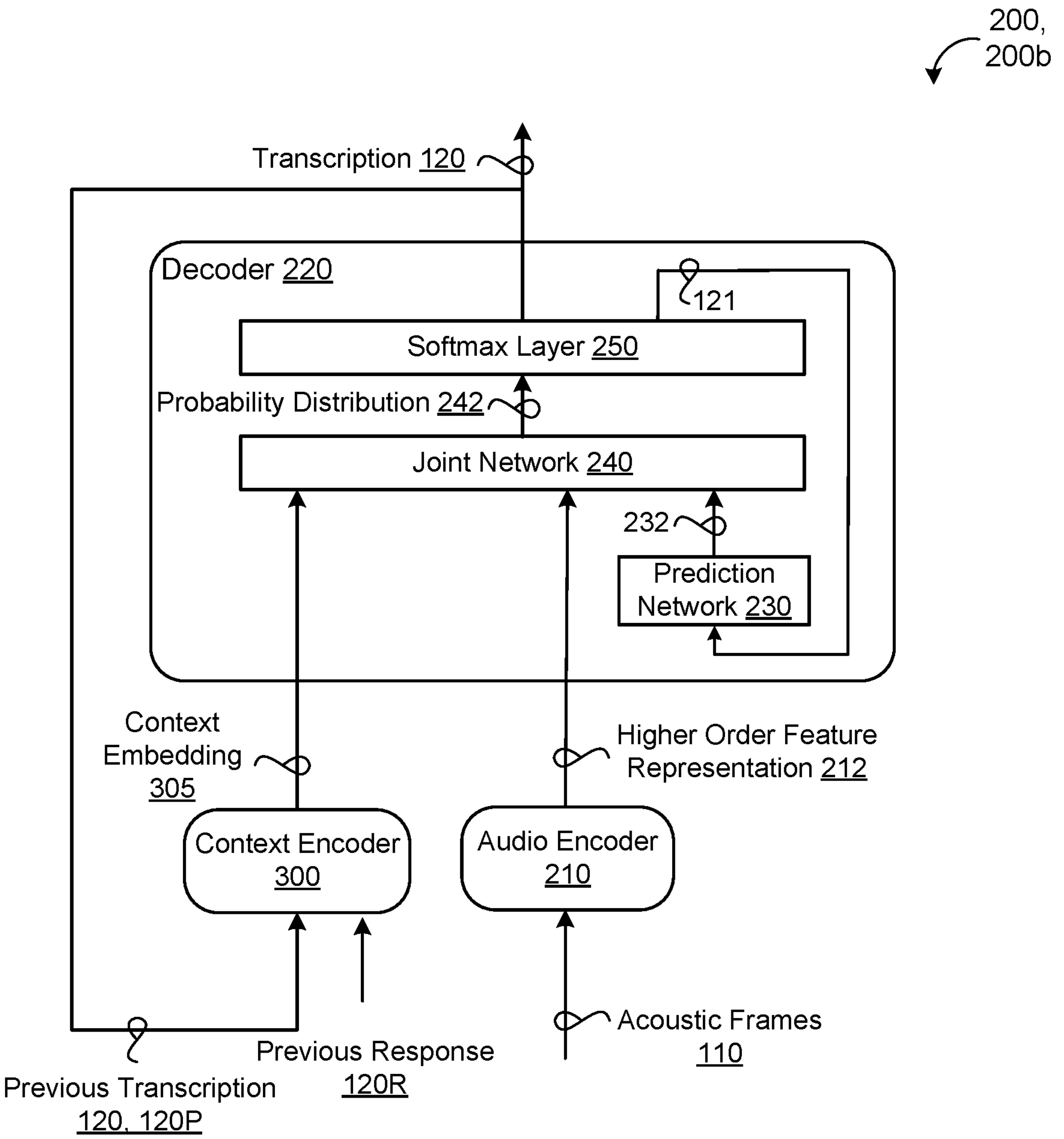

Referring now to FIGS. 2A and 2B, the ASR model 200 may include an audio encoder, a decoder 220, and a context encoder 300. As will become apparent, the context encoder 300 generates a context embedding 305 based on previous transcriptions 120, 120P generated by the ASR model 200. The previous transcriptions 120P correspond to one or more utterances that precede a respective utterance the ASR model 200 is currently transcribing. Thus, the context embedding 305 indicates to the ASR model 200 what was previously spoken as the ASR model 200 processes speech data for the respective utterance. In some configurations, the context encoder 300 outputs the context embedding 305 to the audio encoder 210 (FIG. 2A). In other configurations, the context encoder 300 outputs the context embedding 305 to the decoder 220 (FIG. 2B).

In some examples, the ASR model 200 segments the sequence of acoustic frames 110 into multiple short segments (i.e., sequences) of acoustic frames 110 whereby each segment of acoustic frames 110 corresponds to a respective utterance (e.g., $utt_1$, $utt_2$, . . . , $utt_K$). Thus, the sequence of acoustic frames 110 may represent a long-form audio input whereby each segmented of acoustic frames represents a respective utterance from the long-form audio input (e.g., a portion from the long-form audio input). As such, at each output step of the $k^{th}$ utterance, the ASR model 200 processes the corresponding segment of acoustic frames 110 to generate a transcription 120 for the $k^{th}$ utterance. The ASR model 200 may operate in a streaming fashion whereby the ASR model 200 does not receive any additional right-context when generating the transcription 120 or operate in a non-streaming fashion such that the ASR model 200 processes additional right-context when generating the transcription 120.

The decoder 220 may include a Recurrent Neural Network-Transducer (RNN-T) architecture. That is, the decoder 220 includes a prediction network 230, a joint network 240, and a Softmax layer (e.g., final Softmax layer) 250. In the example shown, the Softmax layer 250 is integrated with the decoder 220 such that the output of the decoder 220 represents the output of the Softmax layer 250. For instance, the Softmax layer 250 may be integrated with the joint network 240. Although not illustrated, in some examples, the Softmax 250 layer may be separate from the decoder 220.

In some implementations, the context encoder 300 receives one or more previous transcriptions 120P output by the decoder 220 of the ASR model 200 each corresponding to a respective previous utterance (e.g., $utt_{k-M}$, . . . , $utt_{k-2}$, $utt_{k-1}$) that includes one or more words. Additionally or alternatively, the context encoder 300 may receive one or more previous responses 120R output by a digital assistant during one or more previous turns in a multi-turn conversation between the user 104 and the digital assistant. Here, M represents a context size of the context encoder 300 indicating a number of previous transcriptions 120P (and/or previous responses 120R) the context encoder 300 receives when generating the context embedding 305. Simply put, the context encoder 300 receives and processes M number of previous transcriptions 120P output by the ASR model 200 when generating the context embedding 305. Thus, the context size limits an amount of previous transcriptions 120P that the ASR model 200 considers.

For example, the ASR model 200 may receive a sequence of acoustic frames 110 representing speech of "Big game is at Berkeley this year. I think Cal will be the winner" and segment the sequence of acoustic frames into two sequences of acoustic frames 110. Continuing with the example, the ASR model 200 processes the first sequence of acoustic frames 110 to generate the transcription 120 of "Big game is at Berkeley this year" and then begins processing the second sequence of acoustic frames 110. While processing the second sequence of acoustic frames 110, the context encoder 300 receives the previously generated transcription 120P of "Big game is at Berkeley this year" and generates the context embedding 305 based on the previous transcription 120P. As such, the context embedding 305 indicates to the ASR model 200 that the speech of "Big game is at Berkeley this year" was previously spoken as the ASR model 200 processes the second sequence of acoustic frames 110 corresponding to "I think Cal will be the winner."

Referring now to FIG. 2A, the audio encoder 210 of a first example ASR model 200, 200*a* is configured to receive the context embedding 305 generated by the context encoder 300 and a sequence of d-dimensional feature vectors (e.g., sequence of acoustic frames 110) $x=(x_1, x_2, \ldots, x_T)$ where $x_t \in \mathbb{R}^d$, and generate, at each output step, a higher order feature representation 212 for a corresponding acoustic frame 110 in the sequence of acoustic frames 110. More specifically, at each output step, the audio encoder 210 concatenates the context embedding 305 with the segment of acoustic frames 110 corresponding to the $k^{th}$ utterance and generates the higher order feature representation 212 based on the concatenation. Thus, the higher order feature representation 212 is conditioned on the context embedding 305. Advantageously, injecting the context embedding 305 into the audio encoder 210 enables the audio encoder 210 to more accurately produce the higher order feature representations 212 because the context embedding 305 indicates to the audio encoder 210 what has previously been spoken.

The joint network 240 of the decoder 220 is configured to receive, as input, a dense representation 350 generated by the prediction network 230 and the higher order feature representation 212 generated by the audio encoder 210 and generate, at each output step, a probability distribution 242 over possible speech recognition hypotheses based on the higher order feature representation 212 and the dense representation 350. As used herein, "possible speech recognition hypotheses" correspond to a set of output labels/symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 240 may output a set of values indicative of the likelihood of occurrence of each of a predetermined set of output labels. The set of values can be a vector (e.g., a one-hot vector) and can indicate a probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The probability distribution 242 output by the joint network 240 can include a posterior probability value for each of the different output labels. Thus, if there are 100 different output labels representing different graphemes or other symbols, the output of the joint network 240 can include 100 different probability values, one for each output label. The probability distribution 242 can then be used to select and assign scores to candidate orthographic elements (e.g., graphemes, wordpieces, and/or words) in a beam search process by the Softmax layer 250. For example, the Softmax layer 250 may identify a respective one of the speech recognition hypotheses having a corresponding highest probability from the probability distribution 242 and generate the transcription of the input utterance based on the identified respective one of the possible speech recognition hypotheses having the corresponding highest probability.

With continued reference to FIG. 2A, in some implementations, the prediction network 230 receives, as input, a sequence of non-blank symbols 121 output by the Softmax layer 250 and generates, at each output step, a dense representation 232. The sequence of non-blank symbols 121 corresponds to the transcription 120 output by the Softmax layer 250 with any spaces or blank symbols removed. Thus, the joint network 240 generates, at each output step, the transcription 120 for the $k^{th}$ utterance based on the higher order feature representation 212 and the dense representation 232 representing word-piece tokens previously seen for prior utterances.

However, in some scenarios, injecting the context embedding 305 into the audio encoder 210 requires synchronized acoustic observations and context embeddings 205 while the context embedding 305 is likely delayed due to the latency of the decoder 220. Therefore, the audio encoder 210 and the decoder 220 of the first example ASR model 200*a* may only be able to execute synchronously and introduce additional computational latency compared to streaming ASR models. Accordingly, the context embedding 305 may additionally or alternatively be injected into the decoder 220.

To that end, referring now to FIG. 2B, in some implementations, the decoder 220 of a second example ASR model 200, 200*b* receives the context embedding 305. More specifically, the audio encoder 210 of the second example ASR model 200*b* is configured to receive the sequence of d-dimensional feature vectors (e.g., sequence of acoustic frames 110) $x=(x_1, x_2, \ldots, x_T)$ where $x_t \in \mathbb{R}^d$, and generate, at each output step, the higher order feature representation 212 for a corresponding acoustic frame 110 in the sequence of acoustic frames 110. The joint network 240 of the decoder 220 is configured to receive, as input, the dense representation 350 generated by the prediction network 230, the higher order feature representation 212 generated by the audio encoder 210, and the context embedding 305 generated by the context encoder 300 and generate, at each output step, a probability distribution 242 over possible speech recognition hypotheses based on the higher order feature representation 212, the dense representation 350, and the context embedding 305.

With continued reference to FIG. 2B, the prediction network 230 receives, as input, a sequence of non-blank symbols 121 output by the Softmax layer 250 and generates, at each output step, a dense representation 232. The sequence of non-blank symbols 121 corresponds to the transcription 120 output by the Softmax layer 250 with any spaces or blank symbols removed. Thus, the joint network 240 generates, at each output step, the transcription 120 for the $k^{th}$ utterance based on the higher order feature representation 212 and the dense representation 232 representing word-piece tokens previously seen for prior utterances.

In particular, the joint network 240 may use a 3-way tensor fusion mechanism to fuse the context embedding 305 generated by the context encoder 300, the higher order feature representation 212 generated by the audio encoder 210, and the dense representation 232 generated by the prediction network 230. In some examples, the joint network 240 may include a single fully connected layer with a hyperbolic tangent (tanh) activation function such that the joint network 240 generates the probability distribution 242 based on a concatenation of the context embedding 305, the higher order feature representation 212, and the dense representation 232 according to:

$$h_{t,u,k}^{joint} = W^{joint} concat\left(c_k,\ h_t^{acou},\ h_u^{pred}\right) \tag{1}$$

In Equation 1, the concat operation represents a vector concatenation operation, $W^{joint}$ represents the fully connected layer weight matrix of the joint network 240, $$h_{t,u,k}^{joint}$$

represents the probability distribution 242, $c_k$ represents the context embedding 305, $$h_t^{acou}$$

represents the higher order feature representation 212, and $$h_u^{pred}$$

represents the dense representation 232. In other examples, the joint network 240 generates the probability distribution 242 using bilinear pooling with residual connections to fuse the context embedding 305, the higher order feature representation 212, and the dense representation 232 according to:

$$h_{t,u,k}^{joint} = \mathcal{W}\left(c_k \otimes h_t^{acou} \otimes h_u^{pred}\right) \quad (2)$$

Based on Equation 2, the joint network 240 determines an outer-product as an expressive $D^{ctx}$, $D^{acou}$, and $D^{pred}$ where $D^{ctx}$, $D^{acou}$, and $D^{pred}$ are the dimensions of the context embedding ($c_k$) 305, the higher order feature representation $$(h_t^{acou})$$

212, and the dense representation $$(h_u^{pred})$$

232, respectively. To avoid a large weight tensor W the joint network 240 may use a low-rank approximation used for bilinear pooling according to:

$$\hat{h}_{t,u,k}^{joint} = \tanh\left(W_{low}^{ctx} c_k\right) \odot \tanh\left(W_{low}^{acou} h_t^{acou}\right) \odot \tanh\left(W_{low}^{pred} h_u^{pred}\right) \quad (3)$$

In Equation 3, $$W_{low}^{ctx},\ W_{low}^{acou}, \text{ and } W_{low}^{pred}$$

are $D^{rank} \times D^{ctx}$-dim, $D^{rank} \times D^{acou}$-dim, and $D^{rank} \times D^{pred}$-dim weight matrices, and $D^{rank}$ is the rank of $\mathcal{W}$. Thereafter, a projection layer and residual connections of the joint layer 240 are used to generate the probability distribution 242 according to:

$$h_{t,u,k}^{joint} = \tanh\left(W^{proj} \hat{h}_{t,u,k}^{joint} + W_{joint}^{ctx} c_k + W_{joint}^{acou} h_t^{acou} + W_{joint}^{pred} h_t^{pred}\right) \quad (4)$$

In short, the ASR model 200 generates a corresponding transcription 120 for each acoustic frame 110 by incorporating the context embedding 305 representing context of previously spoken utterances. The context embedding 305 may be considered when generating the higher order feature representation 212 (FIG. 2A) or when generating the probability distribution 242 over possible speech recognition hypotheses (FIG. 2B).

Figure 3A:
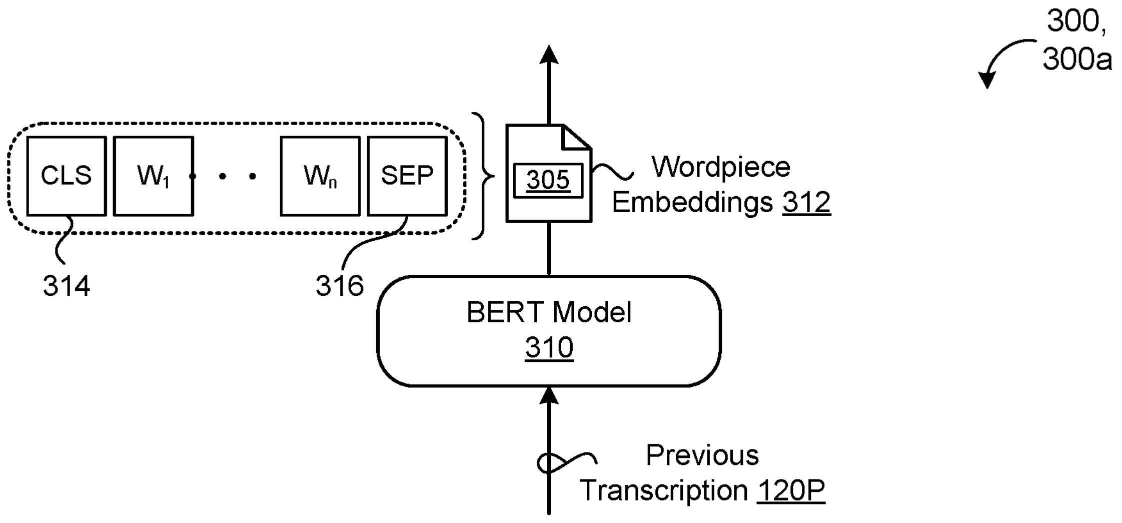
FIGS. 3A and 3B are schematic views of example context encoders.
Figure 3B:
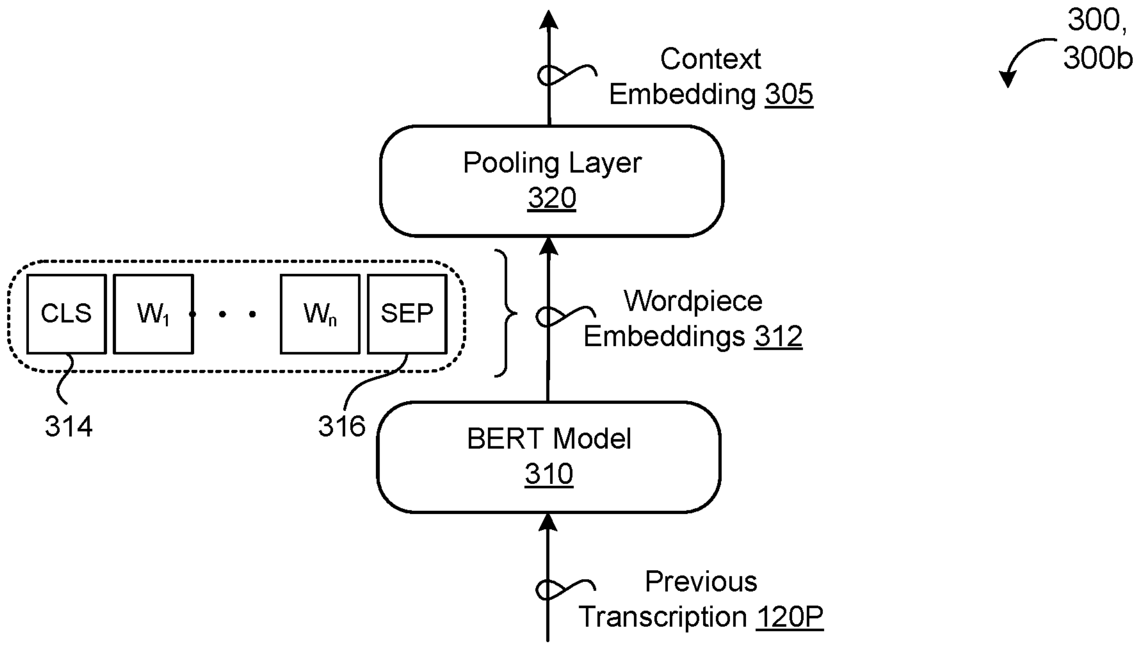

Referring now to FIGS. 3A and 3B, in some implementations, the context encoder 300 includes a pre-trained Bidirectional Encoder Representations from Transformers (BERT) model 310. The pre-trained BERT model 310 (also referred to as simply "BERT model 310") to produce a sequence of wordpiece embeddings 312 from the previous transcriptions 120P (and/or previous responses 120R). The BERT model may be pre-trained on text-only to produce wordpiece embeddings 312 that embody syntactic information (e.g., linguistic structure) of the previous transcriptions 120P implicitly, while also providing useful cues beyond syntax, such as word semantics and word knowledge.

In some examples, the BERT model 310 is configured to receive, as input, the previous transcriptions 120P (and/or previous responses 120R) generated by the ASR model 200 (FIGS. 2A and 2B) and generate, at each output step, the sequence of wordpiece embeddings 312 based on the previous transcriptions 120P. Each wordpiece embedding 312 in the sequence of wordpiece embeddings 312 corresponds to a wordpiece from the previous transcriptions 120P and includes a corresponding weight (W). The corresponding weight may indicate an amount of influence (i.e., semantic information) the respective wordpiece embedding 312 has within the sequence of wordpiece embeddings 312. In the example shown, $W_1$ represents a first wordpiece embedding 312 corresponding to a first word from the previous transcription 120P that includes a first weight and $W_n$ represents an $n^{th}$ wordpiece embedding for the $n^{th}$ wordpiece from the previous transcription 120P that includes an $n^{th}$ weight. The previous transcription 120P may include any number of wordpieces whereby the context encoder 300 only processes M number of previous transcriptions 120P.

The BERT model 310 also adds special classification tokens at the beginning and end of the sequence of wordpiece embeddings 312. In particular, the BERT model 310 prepends a first classification token (i.e., CLS token) 314 to a beginning of the sequence of wordpiece embeddings 312 and appends a second classification token (i.e., separator (SEP) token) 316 at an end of the sequence of wordpiece embeddings 312. The first classification token 314 and the second classification token 316 indicate the beginning and end of each previous transcription 120P, respectively.

Referring now to FIG. 3A, in some implementations, a first example context encoder 300, 300*a* generates the context encoding 305 using the first classification token 314. That is, the first classification token 314 serves as the context encoding 305 output by the first example context encoder 300*a*. In some examples, the first classification token 314 is used as a transcription or sentence embedding that includes a mean or concatenation of all the wordpiece embeddings 312 from the sequence of wordpiece embeddings 312. Thus, the context encoder 300 may extract the context embedding from the first classification token 314.

Referring now to FIG. 3B, in some implementations, a second example context encoder 300, 300*b* includes a pooling layer 320 that includes a stack of multi-head self-attention layers. For instance, the stack of multi-head self-attention layers may include Conformer layers, Transformer layers, or Performer layers. The pooling layer 320 is configured to receive, as input, the sequence of wordpiece embeddings 312 and generate, as output, the context embedding 305. More specifically, the pooling layer 320 generates the context embedding 305 by applying self-attentive pooling over all the wordpiece embeddings 312 from the sequence of wordpiece embeddings 312. In some examples, applying self-attentive pooling over all the wordpiece embeddings includes generating a reweighted sequence of wordpiece embeddings 312 by reweighting the corresponding weight (W) of each respective wordpiece embedding 312 from the sequence of wordpiece embeddings 312. That is, the pooling layer performs self-attentive pooling over wordpiece embeddings $W_1$ to $W_n$. The sequence of wordpiece embeddings 312 is represented by $M_{word,k}$, which has a size of n×r where n is the sequence length of the sequence of wordpiece embeddings 312 (e.g, a fixed length of 512) and r is the output dimension of the BERT model 310 represented by:

$$c_k = wM_{word,k} \tag{5}$$

$$M_{word,k} = (w_1, w_2, \ldots, w_n)_k \tag{6}$$

Thus, to obtain the weight w the pooling layer 320 uses self-attentive pooling according to:

$$w = \text{softmax}\left(W_2 \tanh\left(W_1 M_{word,k}^T\right)\right) \tag{7}$$

In Equation 7, $W_1$ is a d×r matrix and $W_2$ is a vector of size d. Moreover, the size of $W_2$ is a hyper parameter and the final weight w will have a size n as the matrix of wordpiece embeddings 312 has a size of n×r. The Softmax operation in Equation 7 ensures the final weight w sums up to 1. In short, the pooling layer 320 obtains the weights of the wordpiece embeddings 312 from the sequence of wordpiece embeddings 312 (Equation 7) and then reweights the weight of each wordpiece embedding (Equation 3) to generate the context embedding 305. Stated differently, the pooling layer 320 performs multi-head self-attentive pooling to obtain multiple reweighted vectors and then concatenates the multiple reweighted vectors to represent multiple components in a sentence that together forms the overall context of the previous transcriptions 120P (and/or previous responses 120R).

Figure 4:
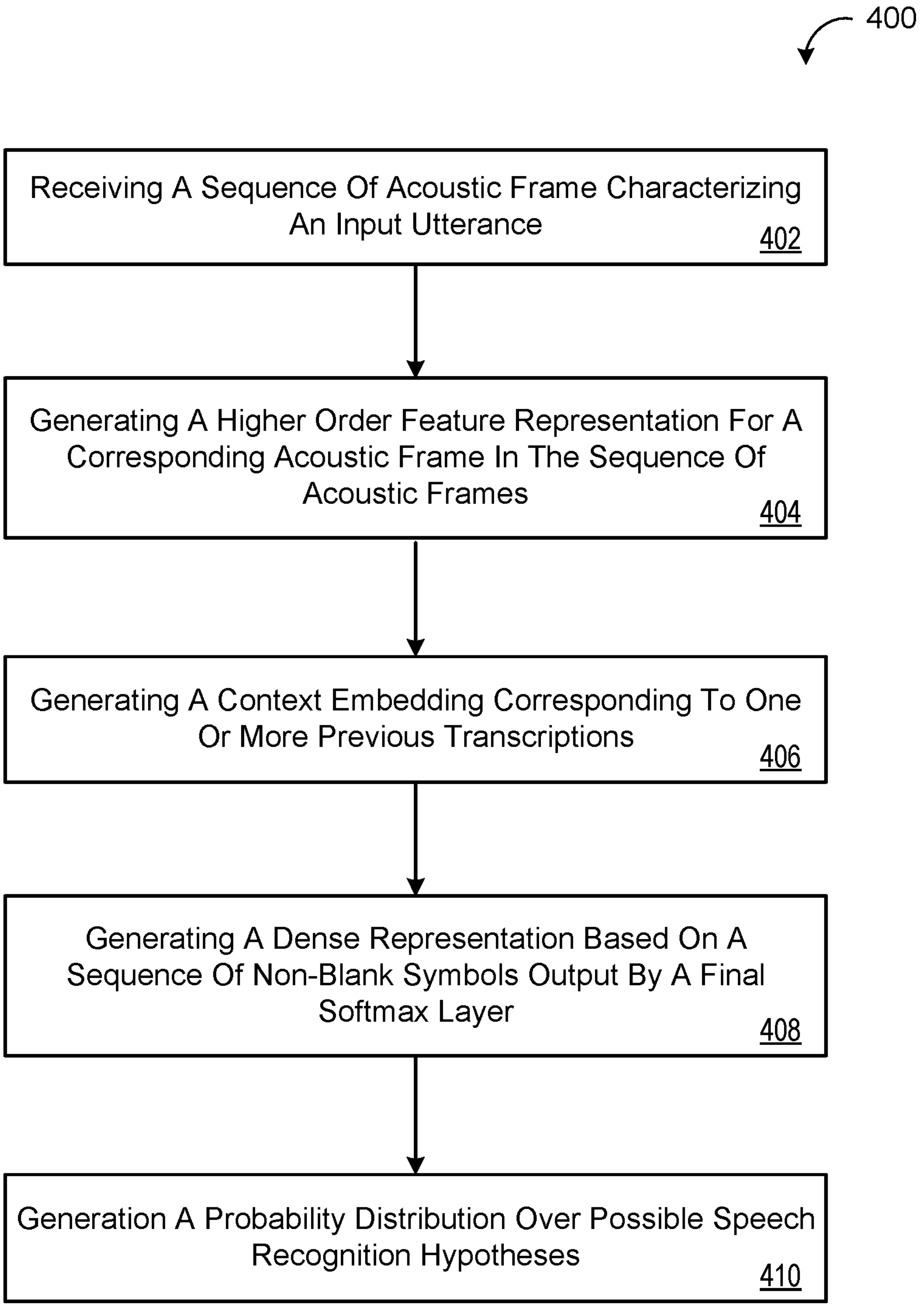
FIG. 4 is a flowchart of example arrangements of operations for a computer-implemented method of executing a context aware end-to-end speech recognition model.
Figure 5:
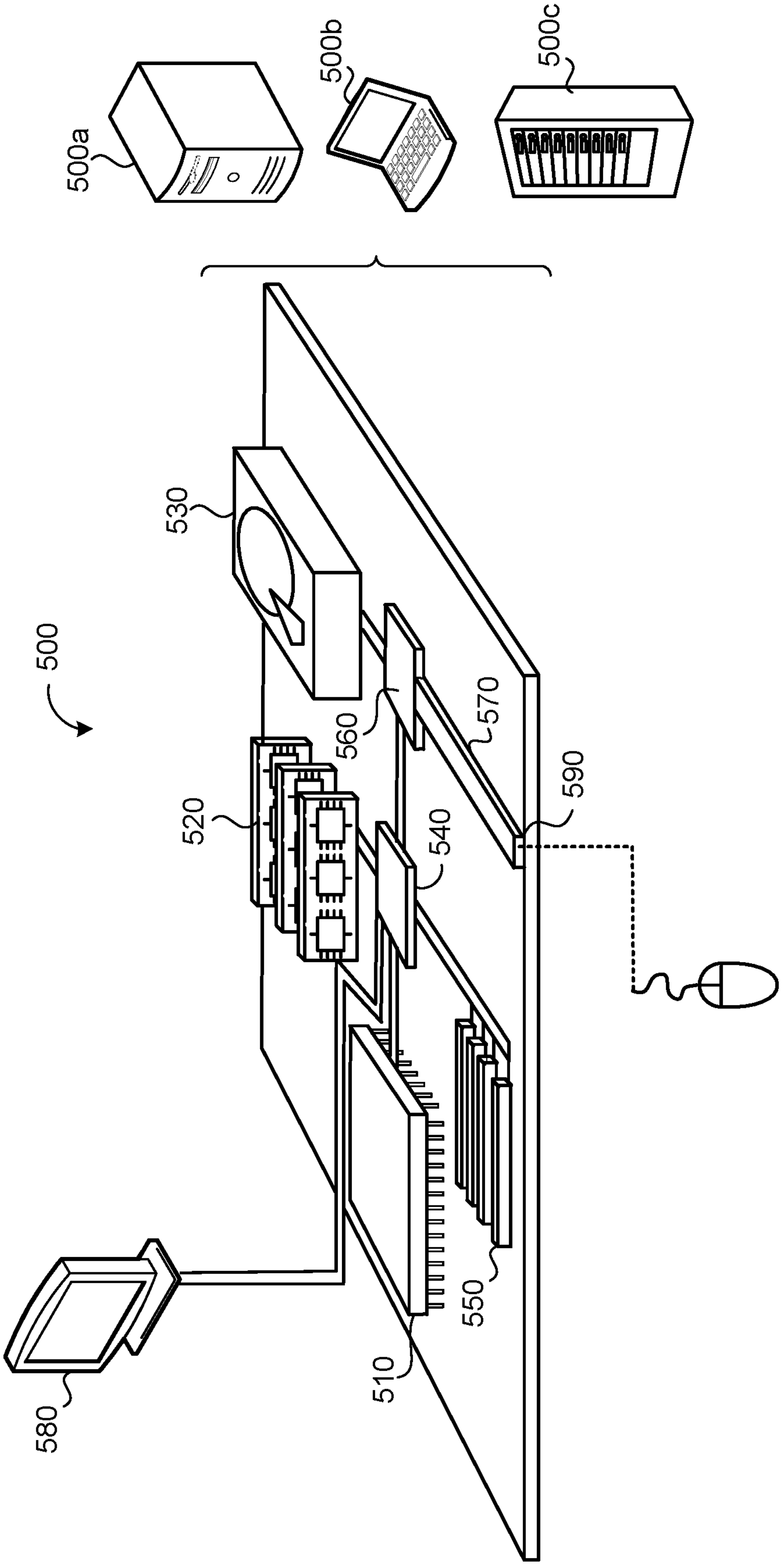
FIG. 5 is a schematic view of an example computing device that may be used to implement the systems and methods described herein.

FIG. 4 is a flowchart of an example arrangement of operations for a computer-implemented method of executing a context aware end-to-end speech recognition model. The method 310 may execute on data processing hardware 510 (FIG. 5) using instructions stored on memory hardware 520 (FIG. 5). The data processing hardware 510 and the memory hardware 520 may reside on the user device 102 and/or the remote computing device 201 of FIG. 1 corresponding to a computing device 500 (FIG. 5).

At operation 402, the method 400 includes receiving, as input to an ASR model 200, a sequence of acoustic frames 110 characterizing an input utterance. At operation 404, the method 400 includes generating, at each of a plurality of output steps, a higher order feature representation 212 for a corresponding acoustic frame 110 in the sequence of acoustic frames 110 using an audio encoder 210. At operation 406, the method 400 include generating, at each of the plurality of output steps, a context embedding 305 corresponding to one or more previous transcriptions 120P output by the ASR model 200. Each previous transcription 120P corresponds to a respective previous utterance 120P that includes one or more words. Optionally, in addition to or in lieu of previous transcriptions 120P, the context embedding 305 may correspond to one or more previous responses 120R output by a digital assistant during one or more previous turns in a multi-turn conversation between the user and the digital assistance. At operation 408, the method 400 includes generating by a prediction network 230 a dense representation 232 based on a sequence of non-blank symbols 121 output by a final Softmax layer 250. The sequence of non-blank symbols 121 may correspond to a transcription 120 output by the final Softmax layer 250 with spaces and/or blank symbols removed therefrom. At operation 410, the method 400 includes generating, at each of the plurality of output steps, a probability distribution 242 over possible speech recognition hypotheses using a joint network 240 of the ASR model 200. The joint network 240 generates the probability distribution 242 based on the context embeddings 305 generated by the context encoder 300 at each of the plurality of output steps, the higher order feature representation 212 generated by the audio encoder 210 at each of the plurality of output steps, and the dense representation 232 generated by the prediction network 230 at each of the plurality of output steps.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising data processing hardware and memory hardware storing instructions that when executed on the data processing hardware cause the data processing hardware to implement an automated speech recognition (ASR) model comprising:

an audio encoder configured to:

receive, as input, a sequence of acoustic frames characterizing an input utterance;

generate, at each of a plurality of output steps, a higher order feature representation for a corresponding acoustic frame in the sequence of acoustic frames;

a context encoder configured to:

receive, as input, one or more previous transcriptions output by the ASR model, each previous transcription corresponding to a respective previous utterance comprising one or more words;

generate, at each of the plurality of output steps, a context embedding corresponding to the one or more previous transcriptions;

a prediction network configured to:

receive, as input, a sequence of non-blank symbols output by a final Softmax layer; and generate, at each of the plurality of output steps, a dense representation; and a joint network configured to:

receive, as input, the context embedding generated by the context encoder at each of the plurality of output steps, the higher order feature representation generated by the audio encoder at each of the plurality of output steps, and the dense representation generated by the prediction network at each of the plurality of output steps;

fuse, at each of the plurality of output steps, using a 3-way tensor fusion mechanism, the context embedding, the higher order feature representation, and the dense representation into a fused representation; and generate, at each of the plurality of output steps, a probability distribution over possible speech recognition hypotheses based on the fused representation.

2. The system of claim 1, wherein the final Softmax layer is configured to:

for each probability distribution over possible speech recognition hypotheses, identify, at each of the plurality of output steps, a respective one of the possible speech recognition hypotheses having a corresponding highest probability from the probability distribution; and generate, at each of the plurality of output steps, a transcription of the input utterance based on the identified respective one of the possible speech recognition hypotheses having the corresponding highest probability.

3. The system of claim 1, wherein the ASR model further comprises a decoder comprising the joint network, the prediction network, and the final Softmax layer.

4. The system of claim 1, wherein the context encoder comprises a pre-trained Bidirectional Encoder Representations from Transformers (BERT) model configured to:

receive, as input, the one or more previous transcriptions output by the ASR model; and generate, at each of the plurality of output steps, a sequence of wordpiece embeddings based on the one or more previous transcriptions.

5. The system of claim 4, wherein the context encoder further comprises a pooling layer configured to generate, at each of the plurality of output steps, the context embedding by applying self-attentive pooling over all the wordpiece embeddings from the sequence of wordpiece embeddings.

6. The system of claim 5, wherein:

each respective wordpiece embedding of the sequence of wordpiece embeddings comprises a corresponding weight; and applying self-attentive pooling over all the wordpiece embeddings from the sequence of wordpiece embeddings comprises generating a reweighted sequence of wordpiece embeddings by reweighting the corresponding weight of each respective wordpiece embedding.

7. The system of claim 5, wherein the pooling layer comprises a stack of multi-head self-attention layers comprising at least one of:

Conformer layers;

Transformer layers; or

Performer layers.

8. The system of claim 4, wherein the pre-trained BERT model configured to:

prepend a first classification token to a beginning of the sequence of wordpiece embeddings; and append a second classification token to an end of the sequence of wordpiece embeddings.

9. The system of claim 8, wherein the context encoder generates the context embedding based on the first classification token.

10. The system of claim 1, wherein:

the audio encoder is further configured to receive, as input, the context embedding generated by the context encoder at each of the plurality of output steps; and the audio encoder generates the higher order feature representation based on the context embedding.

11. A computer-implemented method that when executed on data processing hardware causes the data processing hardware to perform operations comprising:

receiving, as input to an automatic speech recognition (ASR) model, a sequence of acoustic frames characterizing an input utterance;

generating, by an audio encoder of the ASR model, at each of a plurality of output steps, a higher order feature representation for a corresponding acoustic frame in the sequence of acoustic frames;

generating, by a context encoder of the ASR model, at each of the plurality of output steps, a context embedding corresponding to one or more previous transcriptions output by the ASR model, each previous transcription corresponding to a respective previous utterance comprising one or more words;

generating, by a prediction network of the ASR model, at each of the plurality of output steps, a dense representation based on a sequence of non-blank symbols output by a final Softmax layer;

fusing, by a joint network of the ASR model and at each of the plurality of output steps, using a 3-way tensor fusion mechanism, the context embedding, the higher order feature representation, and the dense representation into a fused representation; and generating, by the joint network, at each of the plurality of output steps, a probability distribution over possible speech recognition hypotheses based on the fused representation.

12. The computer-implemented method of claim 11, wherein the operations further comprise:

for each probability distribution over possible speech recognition hypotheses, identifying, by the final Softmax layer, at each of the plurality of output steps, a respective one of the possible speech recognition hypotheses having a corresponding highest probability from the probability distribution; and generating, by the final Softmax layer, at each of the plurality of output steps, a transcription of the input utterance based on the identified respective one of the possible speech recognition hypotheses having the corresponding highest probability.

13. The computer-implemented method of claim 11, wherein the ASR model comprises a decoder comprising the joint network, the prediction network, and the final Softmax layer.

14. The computer-implemented method of claim 11, wherein:

the context encoder comprises a pre-trained Bidirectional Encoder Representations from Transformers (BERT) model; and the operations further comprise generating, by the pre-trained BERT model, at each of the plurality of output steps, a sequence of wordpiece embeddings based on the one or more previous transcriptions output by the ASR model.

15. The computer-implemented method of claim 14, wherein:

the context encoder further comprises a pooling layer; and the operations further comprise generating, by the pooling layer, at each of the plurality of output steps, the context embedding by applying self-attentive pooling over all the wordpiece embeddings from the sequence of wordpiece embeddings.

16. The computer-implemented method of claim 15, wherein:

each respective wordpiece embedding of the sequence of wordpiece embeddings comprises a corresponding weight; and applying self-attentive pooling over all the wordpiece embeddings from the sequence of wordpiece embeddings comprises generating a reweighted sequence of wordpiece embeddings by reweighting the corresponding weight of each respective wordpiece embedding.

17. The computer-implemented method of claim 15, wherein the pooling layer comprises a stack of multi-head self-attention layers comprising at least one of:

Conformer layers;

Transformer layers; or

Performer layers.

18. The computer-implemented method of claim 14, wherein the operations further comprise:

prepending, by the pre-trained BERT model, a first classification token to a beginning of the sequence of wordpiece embeddings; and appending, by the pre-trained BERT model, a second classification token to an end of the sequence of wordpiece embeddings.

19. The computer-implemented method of claim 18, wherein the context encoder generates the context embedding based on the first classification token.

20. The computer-implemented method of claim 11, wherein generating the higher order feature representation is based on the context embedding.

21. The system of claim 4, wherein the pre-trained BERT model is further configured to:

receive, as input, one or more previous responses output by a digital assistant during one or more previous turns in a multi-turn conversation; and generate, at each of the plurality of output steps, the sequence of wordpiece embeddings based on the one or more previous responses and the one or more previous transcriptions.

22. The computer-implemented method of claim 14, wherein the operations further comprise:

receiving one or more previous responses output by a digital assistant during one or more previous turns in a multi-turn conversation, wherein generating, by the pre-trained BERT model, at each of the plurality of output steps, the sequence of wordpiece embeddings is further based on the one or more previous responses.

* * * * *